United States Patent [19]

Catron et al.

[11] Patent Number: 5,211,421
[45] Date of Patent: May 18, 1993

[54] AIR BAG COVER DOOR RETAINER

[75] Inventors: Roger W. Catron, Trotwood; Jerry T. Shell, Waynesville, both of Ohio

[73] Assignee: General Motors Corporation, Detroit, Mich.

[21] Appl. No.: 840,782

[22] Filed: Feb. 24, 1992

[51] Int. Cl.⁵ .............................................. B60R 21/16
[52] U.S. Cl. ..................................... 280/728; 280/732
[58] Field of Search ............................ 280/728, 732; 403/405.1, 406.1, 408.1; 411/508, 509, 510, 907, 913; 24/634, 662, 297, 453

[56] References Cited

U.S. PATENT DOCUMENTS

| 4,842,299 | 6/1989 | Okamura et al. | 280/732 |
| 4,893,833 | 1/1990 | Disalvo et al. | 280/732 |
| 5,060,972 | 10/1991 | Satoh et al. | 280/732 |
| 5,150,919 | 9/1992 | Sakakida et al. | 280/732 |

Primary Examiner—Russell D. Stormer
Assistant Examiner—Joseph D. Pape
Attorney, Agent, or Firm—Charles E. Leahy

[57] ABSTRACT

A vehicle air bag installation includes an inflatable air bag mounted in an instrument panel recess for deployment through a rectangular opening. A rectangular cover door engages a recessed abutment around the opening when closed. The abutment includes two apertures which mount rubber fasteners adjacent its rear corners. The fasteners comprise enlarged heads at one end, an intermediate shaft, a shaft enlargement spaced from the head and a mounting shank at the other end received in the abutment apertures. Bifurcated engagement flanges on the door releasably engage the fastener shafts between the heads and the enlargements to mount the door rear edge in the panel opening. Interengageable surfaces on the door and panel have an interference fit to retain the door front edge mounted to the panel. Each fastener has a conical mounting shank having a nipple extending from its end. The nipple extends through and beyond the apertures to enable it to be grasped to deform and pull the shanks through the apertures to secure the fasteners against removal. Air bag inflation applies an upward force to the door which initially disengages the interengageable surfaces which frees the front door edge. This causes the door and the engagement flanges to move upward and forward to stretch and bend the fasteners until the flanges disengage the fastener heads, thus freeing the door rear edge, enabling the entire door to move out of the path of the deploying air bag.

15 Claims, 3 Drawing Sheets

AIR BAG COVER DOOR RETAINER

BACKGROUND OF THE INVENTION

This invention relates generally to vehicle inflatable restraints and, more particularly, to the mounting of a cover door for an inflatable air bag installed in an instrument panel.

Many passenger vehicles manufactured today are equipped with supplemental inflatable restraints for the vehicle driver, commonly known as air bags. An increasing number of vehicles are also being equipped with an air bag for the front seat passenger. This air bag is part of an air bag assembly which includes an inflator and a reaction canister located in a recess in the vehicle instrument panel. The air bag deploys through an opening in the instrument panel.

The instrument panel normally comprises a metal support structure covered by a panel comprising a rigid substrate on which is mounted a resilient foam pad having a flexible plastic decorative outer skin covering. The instrument panel support mounts the air bag assembly in the recess and incorporates a cover door which closes the deployment opening.

In some vehicles the air bag door comprises a foam pad and skin which are an integral portion of the panel. A supporting substrate is cut out to define the door shape. Upon deployment, the inflating air bag forces a door-shaped cutter to rip through the panel foam and skin to release the inflating air bag.

In other vehicles the skin includes a tear seam line of weakened panel material along three sides of the door. This tear seam is fractured by the inflating air bag so that the door swings open about its fourth side, which functions as a hinge, to enable the air bag to properly deploy.

In yet other vehicles this cover door is a separate rectangular panel that is flush mounted in a rectangular opening in the surrounding panel area so that it can be opened and completely removed by the deploying air bag upon inflation. This type of door is usually attached to the instrument panel at its forward edge by a hinge or by a tether to cause the door to swing open about this attachment out of the path of the deploying air bag.

It is essential that this type of door be releasably installed in the panel opening so that it completely separates and moves out of the way of the deploying air bag. However, the door must remain attached to the instrument panel upon opening so that it does not become a hazard to occupant safety.

It is desirable that the door be releasably secured by retaining means which exert a force that is sufficiently great to resist the door being pried open so that the integrity of the air bag installation is preserved. This force must also be sufficiently small to assure that the door is released by the deploying air bag.

It is also desirable that the door be maintained releasably installed by retaining means which reliably remain attached to the instrument panel upon opening. It is important that the retaining means do not become detached during air bag deployment or encroach upon the path of the air bag as it deploys.

SUMMARY OF THE INVENTION

It is therefore an object of this invention to provide retaining means for releasably securing an air bag cover door to an instrument panel which exert a force which is sufficiently great to resist the door being pried open so that the integrity of the air bag installation is preserved, but is sufficiently small to assure that the door is released by the deploying air bag.

It is another object of this invention to provide such retaining means which reliably remain attached to the instrument panel upon opening and do not become detached during air bag deployment and do not encroach upon the path of the air bag as it deploys.

In one aspect, this invention features door retaining means for an air bag installation in a vehicle in which an inflatable air bag is mounted in a recess in the instrument panel for deployment through a rectangular panel opening which has a recessed abutment at its rearward edge. The opening is closed by a rectangular cover door that engages the abutment when installed and is secured to the instrument panel at its forward edge. The retaining means comprise a pair of rubber fasteners mounted at spaced points on the abutment, each fastener having an enlarged head at one end, an intermediate shaft, and a mounting shank at its other end which is mounted on the abutment. A pair of engagement flanges are mounted on the door, each having a bifurcated free end releasably embracing the fastener shaft beneath the fastener head to secure the door rear edge against inadvertent upward movement. Inflation of the air bag causes the engagement flanges to move initially forwardly and upwardly against the fastener heads, simultaneously stretching the fasteners and bending the fastener shanks rearwardly to enable the engagement flanges to disengage the fastener heads. This frees the rearward edge of the door to enable door opening.

In another aspect, this invention features fasteners which each have an enlargement on the shaft spaced from the head a distance approximating the thickness of the engagement flange, thus limiting movement of the rear edge of the door downwardly relative to the instrument panel.

In still another aspect, this invention features a pair of apertures in the abutment for receiving the fastener mounting shanks, each mounting shank being an enlargement of the shaft having a generally conical shape that is endwise convergent to facilitate insertion through the aperture.

In a further aspect, this invention features fasteners having nipples smaller than the apertures which extend from the mounting shank and have a length sufficient to initially extend through and beyond the apertures to enable grasping to pull the shank through the aperture.

In a yet further aspect, this invention features an air bag installation in a vehicle in which an inflatable air bag is mounted in a recess in the instrument panel for deployment through a rectangular panel opening which has a recessed peripheral abutment. The opening is closed by a rectangular cover door that engages the abutment when installed. Retaining means for releasably maintaining the door installed in the panel opening comprise a plurality of spaced apertures in the instrument panel abutment and a plurality of resilient fasteners mounted along the periphery of the door. Each fastener has an enlarged head at one end, an intermediate shaft, and a mounting shank at its other end mounted through an aperture to the abutment. A plurality of spaced engagement flanges are mounted on the door, each having a bifurcated free end releasably embracing the fastener shaft beneath the fastener head to secure the door rear edge against inadvertent upward movement. Inflation of the air bag causes the engagement flanges to move initially forwardly and upwardly against the fastener heads, simultaneously stretching the fasteners and bending the fastener shanks rearwardly to enable disengagement of the fastener heads. This frees the rearward edge of the door to enable door opening.

In a still further aspect, this invention features an air bag installation in a vehicle in which an inflatable air bag is mounted in a recess in the instrument panel for deployment through a rectangular panel opening which has a recessed peripheral abutment. The opening is closed by a rectangular cover door that engages the abutment when installed. Retaining means for releasably maintaining the door installed in the panel opening comprise a pair of spaced apertures in the instrument panel abutment at the rear edge of the opening which each mount a resilient fastener. Each fastener has an enlarged head at one end, an intermediate shaft, and an attachment shank at its other end mounted through the aperture to the abutment. A pair of spaced engagement flanges are mounted on the door, each having a bifurcated free end releasably embracing the fastener shaft beneath the fastener head to secure the door rear edge against inadvertent upward movement. Interengageable surfaces on the door rear edge and the panel opening above the abutment have an interference fit upon door installation to inhibit inadvertent door opening. Inflation of the air bag causes disengagement of the interengageable surfaces which enables the door and the engagement flanges to move initially forwardly and upwardly against the fastener heads. These flanges simultaneously stretch the fasteners and bend the fastener shanks rearwardly to enable the engagement flanges to disengage the fastener heads, thus freeing the rearward edge of the door to enable door opening, while retaining the fasteners mounted to the abutment.

In a preferred embodiment, the fasteners are rubber, the mounting shanks are configured to require a smaller force to insert through the apertures than to withdraw back through the apertures and the force required to release the engagement flanges from the fasteners is less than that required to withdraw the mounting shanks back through the apertures, and the force required to disengage the their interengageable surfaces is less than that required to release the engagement flanges from the fasteners.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
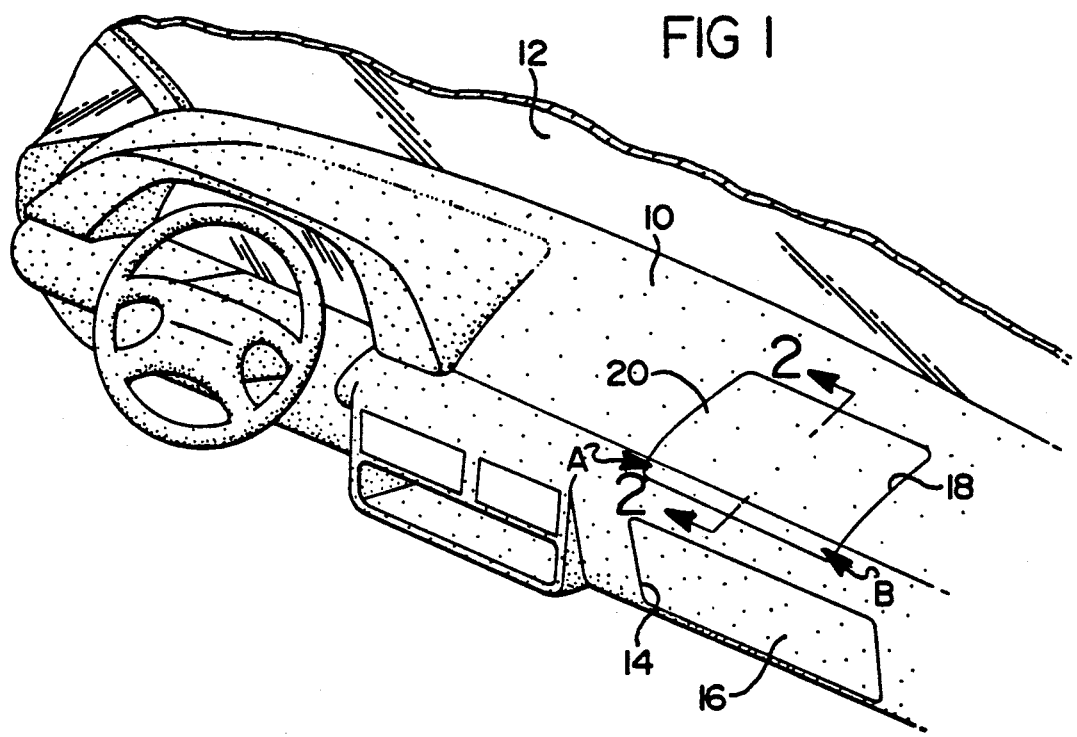
FIG. 1 is a perspective view of a passenger vehicle instrument panel, including an air bag deployment opening closed by a cover door which is maintained in a closed position by retaining means according to this invention.

Referring to FIG. 1 of the drawings, a vehicle passenger compartment includes an instrument panel 10 located immediately rearward of a windshield 12. On its face, instrument panel 10 has the usual glove box opening 14 and glove box door 16. An air bag deployment opening 18 is formed in the top of instrument panel 10 above glove box opening 14.

Figure 2:
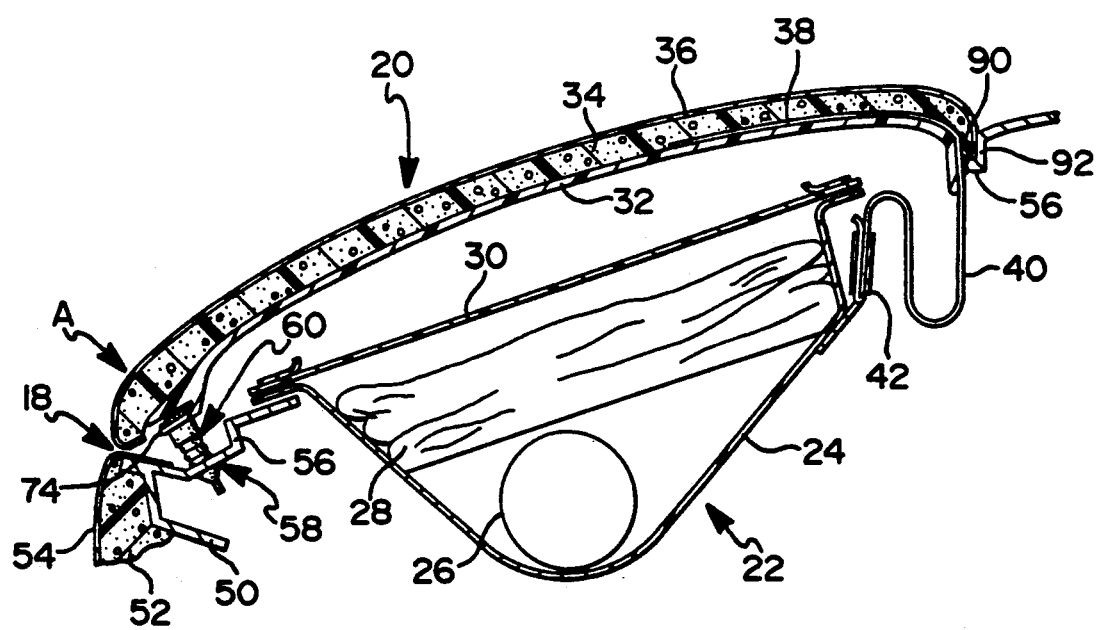
FIG. 2 is an enlarged sectional view, taken along line 2—2 of FIG. 1 showing the air bag module and the door retaining means.
Figure 3:
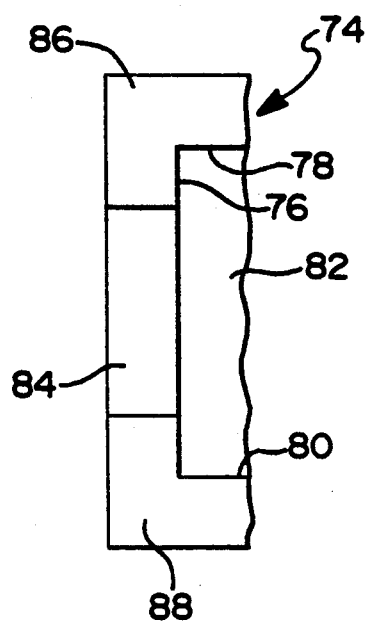
FIG. 3 is an enlarged detail end view of an engagement flange according to this invention.
Figure 4:
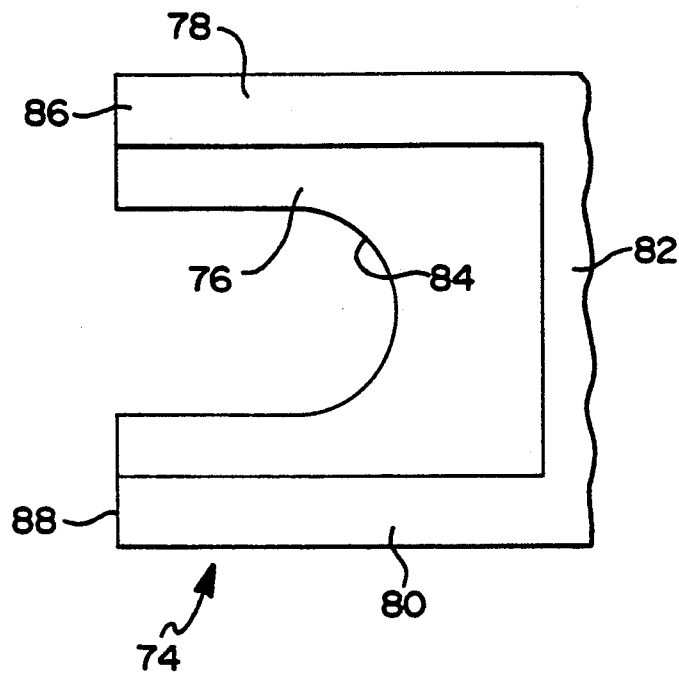
FIG. 4 is a plan view of the flange of FIG. 3.
Figure 5:
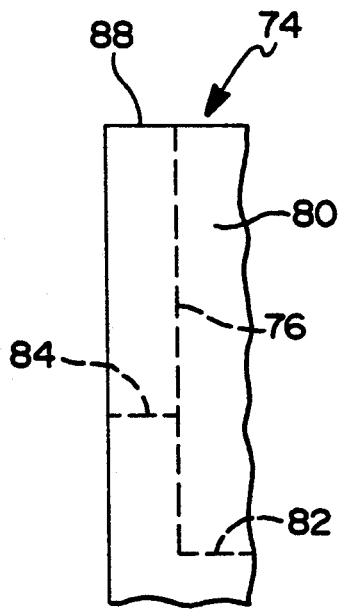
FIG. 5 is a partial side view of the flange of FIG. 3.

Referring additionally to FIG. 2, deployment opening 18 is closed by a cover door 20 over an air bag module 22. Module 22 includes a reaction and deployment canister 24 which houses an inflator 26 for air bag 28. A rupturable dust cover 30 closes the top of canister 24.

Cover door 20 forms an unobtrusive continuation of instrument panel 10 and comprises a rigid plastic substrate 32 which is covered by a foam cushion layer 34 and a decorative vinyl skin 36. At its front, door 20 incorporates the end 38 of a tether 40 between substrate 32 and foam layer 34. The other end of tether 40 is fastened to a bracket 42 on canister 24.

Instrument panel 10 is also comprised of a rigid substrate 50 that is covered by a foam layer 52 and a decorative plastic skin 54. Substrate 50 includes a peripheral flange 56 which forms an abutment engaged by a portion of the periphery of cover door 20 in closed position. The abutment flange 56 includes a mounting aperture 58 at each of its corners A and B. These apertures 58 mount fasteners 60 to secure the rear edge of cover door 20 within the air bag deployment opening 18 in instrument panel 10.

Figure 6:
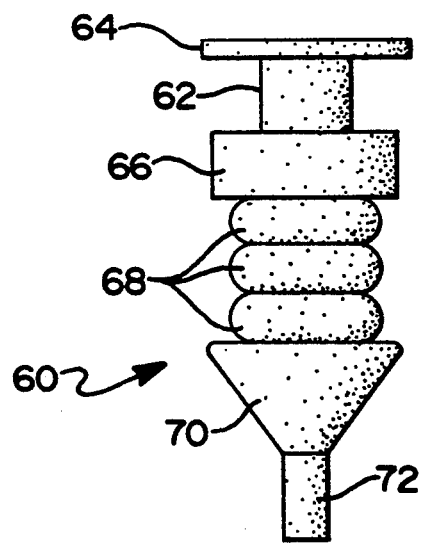
FIG. 6 is an elevation of a preferred form of rubber fastener, according to this invention.

As best shown in FIG. 6, fasteners 60 are made of rubber and include a shaft 62 which mounts an enlarged head 64. Shaft 62 expands into an enlarged cylindrical portion and toroidal segments 68, which terminate in a mounting shank 70. The shank 70 is conical and converges outwardly to a terminal nipple 72.

Referring to FIGS. 2, 3, 4 and 5, two engagement flanges 74 extend from door substrate 32 above the mounting apertures 58. Flanges 74 include a central pocket 76 bounded by walls 78, 80 and 82. Pocket 76 is bifurcated by a cutout 84, forming two fingers 86 and 88.

Figure 7:
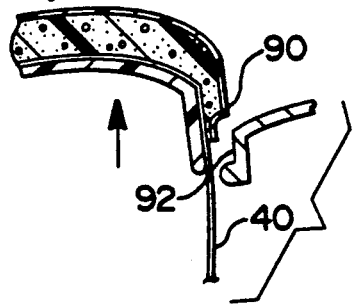
FIG. 7 is an enlarged detail view of the cover door front edge as it initially disengages the instrument panel upon initial deployment of the air bag.

As shown in FIGS. 2 and 7, the front edge 90 of door 20 is in interference engagement with the front edge 92 of abutment flange 56. This interference fit occurs because door edge 90 extends downwardly outwardly, while flange edge 92 extends inwardly downwardly, thus overlying door edge 90. Installation of door 20 in opening 18 will now be described.

Figure 8:
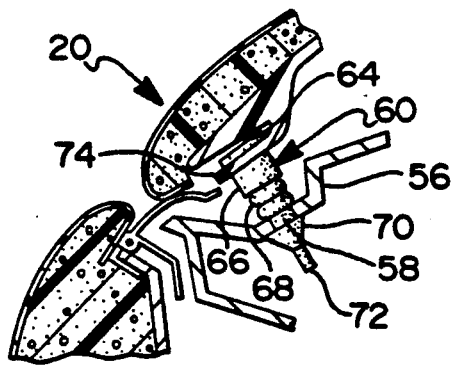
FIG. 8 is an enlarged detail view of the cover door rear edge, showing a flange and a fastener in door closed position.

Referring additionally to FIG. 8, fasteners 60 are first assembled to the bifurcated engagement flanges 74. Fastener 60 is inserted into cutout 84 with head 64 received in pocket 76 surrounded by flange fingers 86 and 88. Thereafter, door front edge 90 is inserted into engagement with flange edge 92. The rear edge of door 20 is then lowered until the fastener engagement flanges 70 rest on the top of abutment flange 56, with nipples 72 extending through apertures 58. Nipples 72 are then grasped and pulled to force shanks 70 through apertures 58. This installation of fasteners 60 in abutment flange 56 is facilitated by the conical shape of engagement flange 74.

Door 20 remains installed in panel opening 18, as illustrated in FIG. 2, and persists until and unless inflator 26 is actuated by a signal from a vehicle-mounted deceleration detector. Upon actuation, inflator 26 will quickly begin filling air bag 28 with pressurized gas. The inflating air bag will burst through the thin dust cover 30 and exert a rapidly increasing upward force on door 20. This force is resisted by the interference fit between edges 90 and 92 and by engagement of the fasteners 60 with door flanges 74 and panel abutment flanges 56.

Figure 8A:
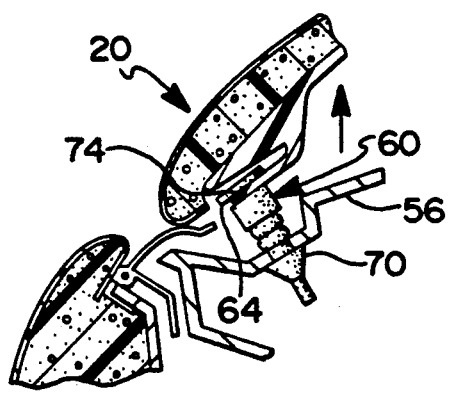
FIGS. 8a, 8b and 8c are views similar to FIG. 8, showing the sequence of movement of the cover door relative to the air bag deployment opening upon air bag deployment, illustrating how the rubber fastener disengages the flange.
Figure 8B:
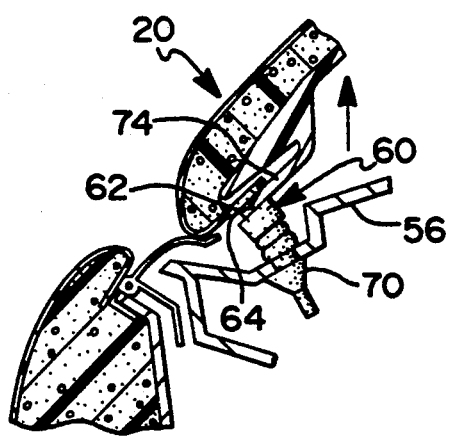

Referring to FIGS. 7, 8a, 8b and 8c, this air bag force will initially overcome the interference fit, the door will begin to open, and the air bag will begin deploying. Door edge 90 will break free of abutment edge 92 and move upwardly, trailing tether 40 behind it, as shown in FIG. 7. Since the rear edge of door 20 is still attached to the abutment 56 by fasteners 60, the deploying air bag will force the door forwardly, as shown in FIG. 8a. This door motion will cause flange fingers 86 and 88 to pull upward on fastener head 64, stretching the fastener. Flanges 74 will begin to disengage shaft 62 forwardly, as illustrated in FIG. 8b.

Figure 8C:
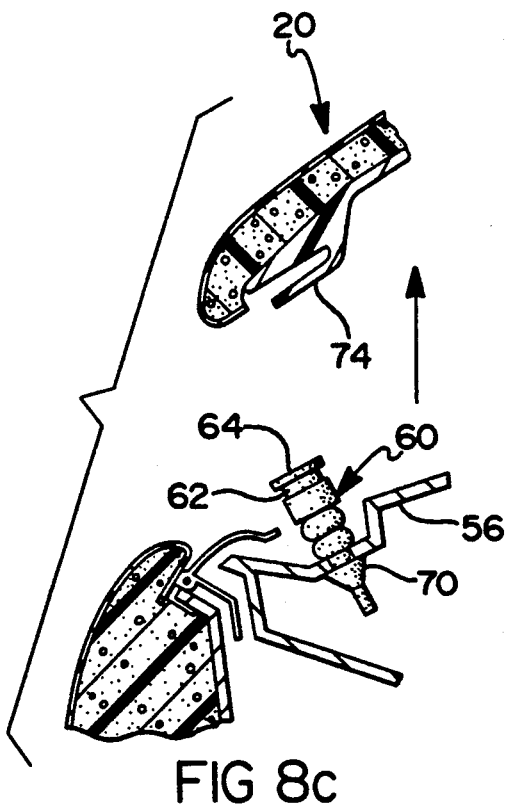

Further deployment of air bag 28 will lift door front edge 90 further upward and rearward, causing further bending of fasteners 60 and further movement of flange fingers 86, 88 from beneath fastener heads 64, as shown in FIG. 8b. Finally, door front edge 90 will reach the end of its tether 40, causing further air bag deployment to jerk door 20 upward and forward, completely freeing flanges 74 from fasteners 60, as shown in FIG. 8c. This frees door 20 to open completely out of the path of air bag deployment, which is upward and forward of opening 18.

Throughout the initial door opening sequence, the fasteners 60 remain intact due to their strength, despite being stretched by the upward stretching force exerted by the inflating air bag. The resisting force exerted by the engagement flanges 72, aided by the friction force supplied by engagement of segments 68 on the periphery of apertures 58, maintains fasteners 60 attached to abutment 56. This door mounting and retaining arrangement insures that the fasteners do not become detached and are so located as to not encroach upon the path of the air bag as it deploys.

While only a preferred embodiment has been illustrated and described, obvious modifications thereof are contemplated within the scope of this invention and the following claims.

We claim:

1. In an air bag installation in a vehicle in which an inflatable air bag is mounted in a recess in the instrument panel for deployment through a rectangular panel opening, having a recessed abutment at its rearward edge, which is closed by a rectangular cover door that engages the abutment when installed and is secured to the instrument panel at its forward edge, retaining mean for releasably maintaining the door installed in the panel opening, comprising a pair of rubber fasteners mounted at spaced points on the abutment, each fastener having an enlarged head at one end, an intermediate shaft, and a mounting shank at its other end mounted on the abutment, and a pair of engagement flanges mounted on the door, each having a bifurcated free end releasably embracing the fastener shaft beneath the fastener head to secure the door rear edge against inadvertent upward movement, whereby inflation of the air bag causes the engagement flanges to move initially forwardly and upwardly against the fastener heads, simultaneously stretching the fasteners and bending the fastener shanks rearwardly to enable the engagement flanges to disengage the fastener heads, thus freeing the rearward edge of the door to enable door opening.

2. The retaining means of claim 1, wherein each fastener has an enlargement on the shaft spaced from the head a distance approximating the thickness of the engagement flange, thus limiting movement of the rear edge of the door downwardly relative to the instrument panel.

3. The retaining means of claim 2, wherein the abutment has a pair of apertures for receiving the fastener mounting shanks, each mounting shank being an enlargement of the shaft having a generally conical shape that is endwise convergent to facilitate installation by insertion through the aperture.

4. The retaining means of claim 3, including a nipple smaller than the aperture extending from the mounting shank, and having a length sufficient to initially extend through and beyond the aperture to enable grasping to pull the shank through the aperture.

5. In an air bag installation in a vehicle in which an inflatable air bag is mounted in a recess in the instrument panel for deployment through a rectangular panel opening, having a recessed peripheral abutment, which is closed by a rectangular cover door that engages the abutment when installed, retaining means for releasably maintaining the door installed in the panel opening, comprising a plurality of spaced apertures in the instrument panel abutment, a plurality of resilient fasteners mounted along the periphery of the abutment, each fastener having an enlarged head at one end, an intermediate shaft, and a mounting shank at its other end mounted to the abutment through an aperture, and a plurality of spaced engagement flanges mounted on the door, each having a bifurcated free end releasably embracing the fastener shaft beneath the fastener head to secure the door rear edge against inadvertent upward movement, whereby inflation of the air bag causes the engagement flanges to move initially forwardly and upwardly against the fastener heads, simultaneously stretching the fasteners and bending the fastener shanks rearwardly to enable disengagement of the engagement flanges from the fastener heads, thus freeing the rearward edge of the door to enable door opening.

6. The retaining means of claim 5, wherein each fastener mounting shank is shaped to require application of a greater force to remove the fastener through the aperture than to insert it.

7. The retaining means of claim 6, wherein each fastener engagement shank is an enlargement of the shaft having a generally conical shape that is endwise convergent to facilitate insertion and which includes a circular engagement flange engaging the aperture periphery.

8. The retaining means of claim 6, wherein each fastener includes a nipple smaller than the aperture, extending from the engagement shank and having a length sufficient to extend through and beyond the aperture prior to insertion to enable grasping and pulling to insert the shank through the aperture.

9. The retaining means of claim 8, wherein each fastener is made of rubber.

10. The retaining means of claim 9, wherein each fastener shaft has a portion larger than the aperture to grip the aperture periphery.

11. The retaining means of claim 5, wherein there are two fasteners received through two apertures adjacent the corners of the opening for engagement by engagement flanges located adjacent the corners of the door.

12. The retaining means of claim 5, wherein each fastener has an enlargement on the shaft spaced from the head a distance approximating the thickness of the engagement flange, thus limiting movement of the rear edge of the door downwardly relative to the instrument panel.

13. In an air bag installation in a vehicle in which an inflatable air bag is mounted in a recess in the instrument panel for deployment through a rectangular panel opening, having a recessed peripheral abutment, the opening being closed by a rectangular cover door that engages the abutment when installed, retaining means for releasably maintaining the door installed in the panel opening, comprising a plurality of spaced apertures in the instrument panel abutment, a plurality of resilient fasteners mounted along the periphery of the door, each fastener having an enlarged head at one end, an intermediate shaft, and an attachment shank at its other end mounted through the aperture to the abutment, a plurality of spaced engagement flanges mounted on the door, each having a bifurcated free end releasably embracing the fastener shaft beneath the fastener head to secure the door rear edge against inadvertent upward movement, and interengageable surfaces on the door front edge and the panel opening above the abutment having an interference fit upon door installation to inhibit inadvertent door opening, whereby inflation of the air bag causes disengagement of the interengageable surfaces which enables the door and the engagement flanges to move initially forwardly and upwardly relative to the fasteners, engaging the fastener heads to simultaneously stretch the fasteners and bend the fastener shanks rearwardly to enable the engagement flanges to disengage the fastener heads, thus freeing the rearward edge of the door to enable door opening, while retaining the fasteners mounted to the abutment.

14. The retaining means of claim 11, wherein there are two fasteners mounted in apertures at the rear corners of the abutment.

15. The retaining means of claim 5, wherein the fasteners are rubber, the mounting shanks are configured to require a smaller force to insert through the apertures than to withdraw back through the apertures and the force required to release the engagement flanges from the fasteners is less than that required to withdraw the mounting shanks back through the apertures, and the force required to disengage the interengageable surfaces is less than that required to release the engagement flanges from the fasteners.

* * * * *